(12) United States Patent
Kakivaya et al.

(10) Patent No.: US 7,668,908 B2
(45) Date of Patent: Feb. 23, 2010

(54) SYSTEM AND METHOD FOR GENERALIZED AND DISTRIBUTED SCALABLE EVENTING SYSTEM

(75) Inventors: GopalaKrishna Reddy Kakivaya, Sammamish, WA (US); Michael J. Toutonghi, Bellevue, WA (US); Anthony Vincent Discolo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 10/016,900

(22) Filed: Dec. 14, 2001

(65) Prior Publication Data

US 2003/0144849 A1    Jul. 31, 2003

(51) Int. Cl.
*G06F 15/16* (2006.01)
(52) U.S. Cl. .................. 709/204; 709/206; 709/207
(58) Field of Classification Search .................. 709/204
See application file for complete search history.

(56) References Cited

U.S. PATENT DOCUMENTS

| | | | | |
|---|---|---|---|---|
| 5,768,528 A | * | 6/1998 | Stumm | 709/231 |
| 5,844,553 A | * | 12/1998 | Hao et al. | 715/733 |
| 5,974,417 A | * | 10/1999 | Bracho et al. | 707/10 |
| 6,202,093 B1 | * | 3/2001 | Bolam et al. | 709/225 |
| 6,327,630 B1 | * | 12/2001 | Carroll et al. | 719/314 |
| 6,336,119 B1 | * | 1/2002 | Banavar et al. | 707/104.1 |
| 6,405,191 B1 | * | 6/2002 | Bhatt et al. | 707/3 |
| 6,405,266 B1 | * | 6/2002 | Bass et al. | 719/328 |
| 6,643,682 B1 | * | 11/2003 | Todd et al. | 709/202 |
| 6,785,726 B1 | * | 8/2004 | Freeman et al. | 709/227 |
| 6,801,936 B1 | * | 10/2004 | Diwan | 709/219 |
| 6,910,070 B1 | * | 6/2005 | Mishra et al. | 709/224 |

OTHER PUBLICATIONS

Carzaniga, A. et al., "Design and Evaluation of a Wide-Area Event Notification Service," *ACM Transactions on computer Systems*, 2001, 19(3), 332-383.
Fabret F. et al., "Filtering Algorithms and Implementation for Very Fast Publish/Subscribe Systems," *Sigmod Record*, 2001, 30(2), 115-126.
Xiaobing, Q. et al., "Applying Object-Orientation and Component Technology to Architecture Design of Power System Monitoring," *Conference Paper (PA)*, 2000.
Journal Paper (JP), "Continual Queries for Internet Scale Event-Driven Information Delivery," Jul.-Aug. 1999.

* cited by examiner

*Primary Examiner*—Ramsey Refai
(74) *Attorney, Agent, or Firm*—Woodcock Washburn LLP

(57) ABSTRACT

Event messages are received from a first source, each has a subscription based-sequence number and a time stamp. The order of events within the first event source are determined on the basis of the subscription based-sequence number. Additional event messages are received from a second source each having a subscription based-sequence number and a time stamp. The events from the second event source are ordered with respect to the first event source on the basis of the time stamp within each of the at least two event messages from the first event source and the another at least two event messages from the second event source.

28 Claims, 10 Drawing Sheets

```
class person
{
    string name;
    string street;
    string city;
    int zip;
    person *spouse;
}
```
— 300

```
<complextype name = "person">
    <sequence>
        <element name = "name"
            type = "xsd: string" />
        <element name = "street"
            type = "xsd: string" />
        <element name = "city"
            type = "xsd: string" />
        <element name = "zip"
            type = "xsd: int" />
        <element name = "spouse"
            type = "TDL: Reference
            TDL: reftype = "tns: person"/>
    </sequence>
</complextype>
```
— 305

Figure 3A

```
<TDL>
  <Service>
    <name> CRM </name>
    <implements> tns: IQueryCRM </implements>
  </Service>
  <Interface>
    <name> IQueryCRM </name>
    <methods>
      <method>
        <name> GetInfo </name>
        <In> tns: GetInfo </In>
        <Out> tns: GetInfoResponse </Out>
      </method>
    </methods>
```

SYSTEM AND METHOD FOR GENERALIZED AND DISTRIBUTED SCALABLE EVENTING SYSTEM

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright© 2000, Microsoft Corp.

FIELD OF THE INVENTION

The present invention relates generally to the field of computing. More particularly, the invention relates to a system and method for subscribing to events in a network environment.

BACKGROUND OF THE INVENTION

Many digital devices such as PDAs, Cell phones, MP3 players, Picture Frames, and so on are available and gaining traction as essential digital devices. Other digital devices, such as personal computers and televisions, have already gained critical mass and are converging into key digital devices for homes and businesses. However, the utility of the devices would be greatly enhanced by a seamless connection among the various digital devices available to a user. As it now stands, all of the digital devices available to a user are not connected, resulting in a less than optimal island of experience. For example, it is generally not possible to access one's schedule or e-mail from a television. Increasing availability of broadband and the growth and evolution in home and business networks provides an opportunity to connect various devices at home to provide seamless user experience available any time, any where and on any device.

Evolution of such a platform at home provides opportunity for ISVs, Telcos, and Satellite/Cable providers to deliver rich integrated services and experiences into home.

A number of software services are needed to enabling rich user experiences among the various digital devices available to users. Examples of such software services include Media Library service that aggregates media metadata from various devices at home, Media Transcoding service that can convert incoming analog such as terrestrial and cable analog data and digital formats such as MPEG2 and MP3 to an internal format such as WMV and WMA for storage and distribution within in home, storage service that devices can use to store persistent data, and calendaring services that maintains family schedule. At the application semantics layer, there should be no fundamental difference between the way a device interacts with a software service and vice-versa and the underlying infrastructure should fully support such an abstraction.

The wide range of digital devices and services available in homes and businesses are deployed/startup in no predefined order and as such it is essential for relationships/dependencies to be formed dynamically and tracked over a period of time. Discovery, rich query language, and eventing (tracking service up/down events) form the basis for building infrastructure that supports establishment of dynamic, tracked relationships/dependencies. As distribution of media and device aggregation are core experiences, it is important for the underlying infrastructure to understand the input/output connections and the location of each device. Thus, connection and spatial information needs to be modeled as well.

SUMMARY OF THE INVENTION

After discovering resources in the system, it is advantageous for the objects to be able to request notification based on events that are controlled by other objects and resources in the distributed environment. According to an aspect of the invention, objects in a communications network can subscribe (i.e. become event sinks) to events sourced by other objects in the communications network. In this capacity, the sink objects subscribe, revoke or renew subscriptions with various ones of the source objects, and set filters on the events being subscribed to. In the network system of the present invention, contracts between programmatic endpoints are formed using a universally agreed upon type system. The network system takes the approach that all type systems flavors have the same constructs at the semantic level.

The network system comprises first and second digital devices wherein the second digital device is capable of communicating with the first digital device by way of a computer network. The first digital device subscribes to a first event source operating on the second digital device whereby the first digital device receives event notification messages that each comprise a sequence number and a time stamp from the first event source when events occur. The system further contemplates an intermediary device in communication with the first digital and second digital device whereby event notification messages are routed to the intermediary device and thereafter forwarded to the first digital device.

The messages between digital devices are constructed in a type description language. Preferably, the type description language has a one to one mapping to an extensible markup language. Typically, the event messages are one-way messages in that the event sink does not indicate that the message was received.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 3A through 3C illustrate exemplary communications that may take place in connection with a customer resource management service that makes use of TDL of the present invention.

DETAILED DESCRIPTION OF THE INVENTION

Overview

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise.

Figure 1:
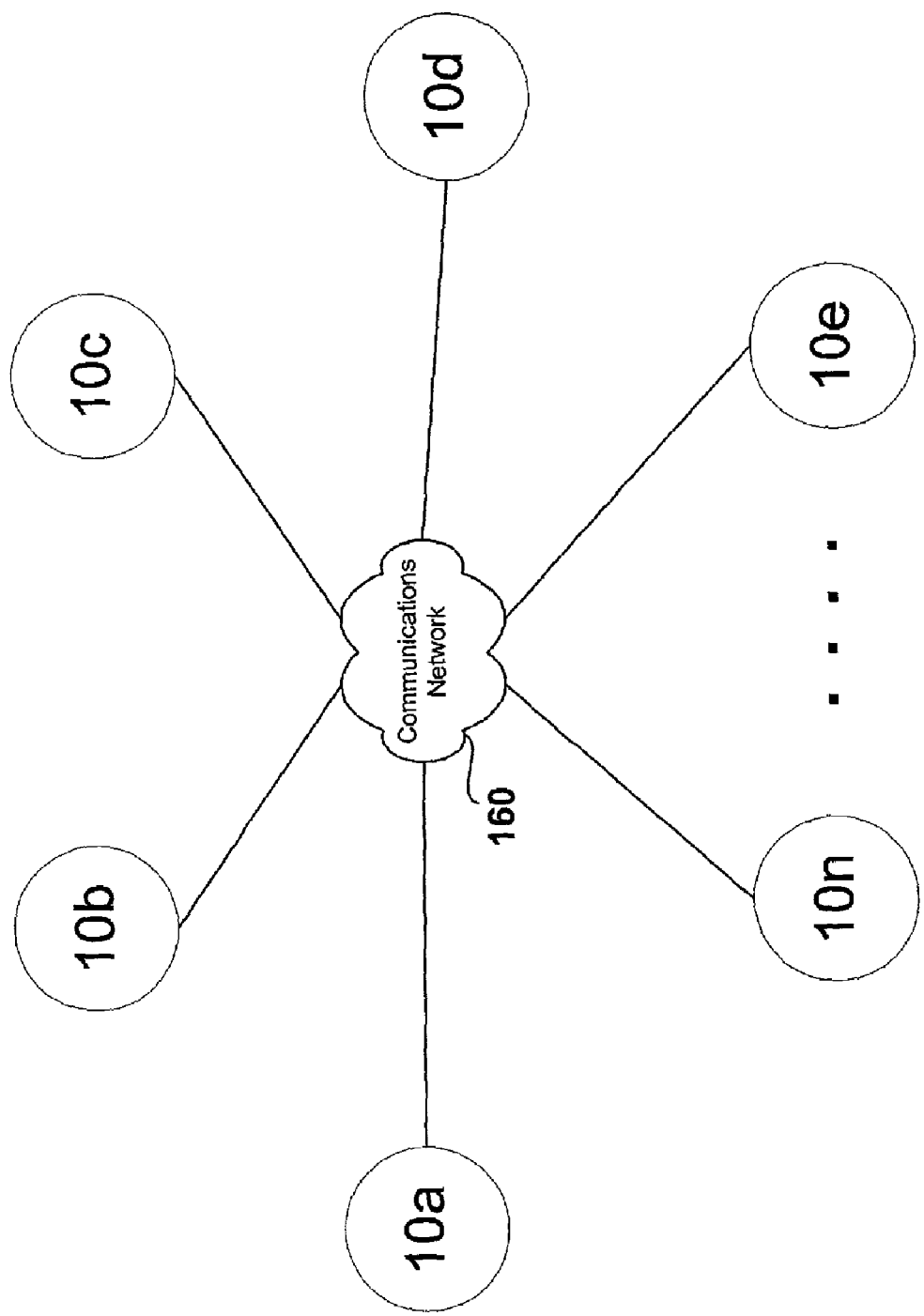
FIG. 1 is a diagram of an exemplary distributed system in which various objects communicate with each other in a communications network.

FIG. 1 provides a schematic diagram of a distributed computing environment. The distributed computing environment comprises computing objects 10A-10n. These objects may comprise programs, methods, data stores, programmable logic, etc. The objects comprise portions of the same or different devices such as PDAs, televisions, MP3 players, Televisions, personal computers, etc. Each object can communicate with another object by way of the communications network 160. This network may itself comprise other computing objects and computing devices that provide services to the system of FIG. 1. In accordance with an aspect of the invention each object 10a-10n may contain services and data that would provide benefits to other of the objects 10a-10n. For example, where one of the objects may process MP3 data, another of the objects may provide an audio output of MP3 data or where on object may contain digital video data, another object may provide digital video output, and so on. In order to provide such benefits, objects 10a-10n require capabilities that allow them to access the resources controlled or maintained by the other objects.

In a distributed computing architecture, computers that may have traditionally been used solely as clients communicate directly among themselves and can act as both clients and servers, assuming whatever role is most efficient for the network. This reduces the load on servers and allows all of the clients to access resources available on other clients thereby increasing the capability of the entire network.

Distributed computing can help businesses deliver services and capabilities more efficiently across diverse geographic boundaries. Moreover, distributed computing can move data closer to the point at which it is actually consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, Intelligent agents can be used to prioritize tasks on a network, change traffic flow, search for files locally or determine anomalous behavior such as a virus and stop it before it effects the network.

Network Services Framework

Network Services (e.g., NET Framework) provide a computing framework that is developing in light of the convergence of personal computing and the Internet. Individuals and business users alike are provided with a seamlessly interoperable and network-enabled interface for applications and computing devices, making computing activities increasingly browser or network-oriented. In general, a Network Services platform includes servers, building-block services, such as Web-based data storage and downloadable device software. The network services appear to each of the objects 10 as part of communications network cloud 160. That is, the exact location of a particular service, control over events, a source of data, etceteras, is in some sense irrelevant to a particular object 10. Rather, the communications network gives and particular object 10 the ability to leverage the resources of all of the other objects 10 in the network.

Generally speaking, the such service provide (1) the ability to make the entire range of computing devices work together and to have user information automatically updated and synchronized on all of them, (2) increased interactive and interoperative capability for network computers, enabled by greater use of XML rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. While exemplary embodiments herein are described in connection with software residing on a server and/or client computer, portions of the invention may also be implemented via an operating system or a "middle man" object between a network and device or object, such that services may be described in, supported in or accessed via any number of languages and services.

Software developers have progressed toward this goal by adopting proprietary componentized software methodologies, such as DCOM; however, because each vendor provides its own interface protocol, integration of different vendors' components is a nightmare. By substituting the Internet for proprietary transport formats and adopting standard protocols such as SOAP, Web Services help software developers create building blocks of software, which can be reused and integrated regardless of their location.

Network Services provide distributed software components that are accessible through standard web protocols. Network Services enable software to interoperate with a much broader range of clients.

Computing Environment

Figure 2:
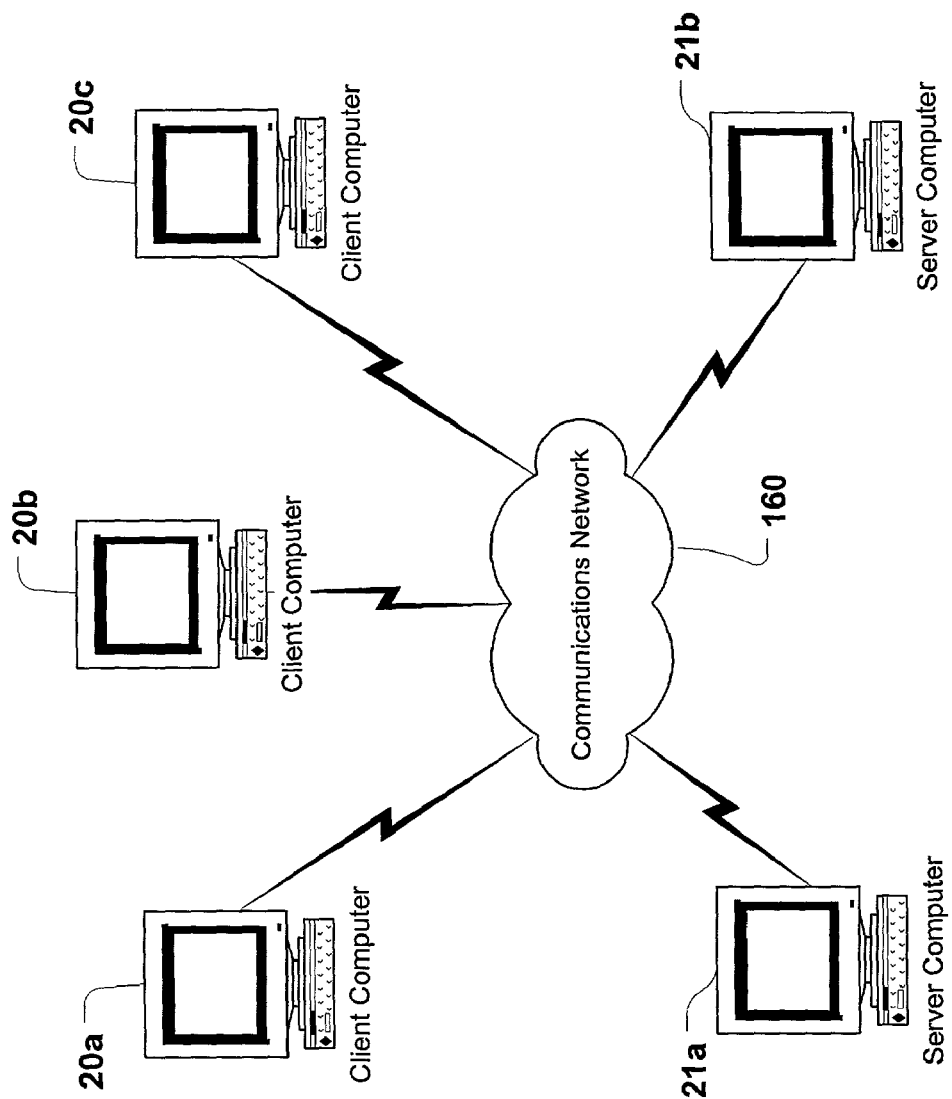
FIG. 2 is an example of a computer network wherein aspects of the present invention may be employed.

FIG. 2 illustrates how the objects of FIG. 1 may be implemented in a physical environment. Here computers 20a-20c and 21a-21b may host various ones of the objects of FIG. 1. Although the physical environment shows the connected devices as computers, such illustration is merely exemplary and may comprise various digital devices such as PDAs, televisions, MP3 players, etc. Moreover, communications network 160 may itself comprise a number of computers and network devices such as routers and the like, which also may be capable of hosting objects 10 and/or providing services to objects 10.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

In home networking environments, there are at least four disparate network transport media that may each support a unique protocol such as Power line, data (both wireless and wired), voice (telephone) and entertainment media. Most home control devices such as light switches and appliances will use power line for connectivity. Data Services enters home as broadband (either DSL or Cable modem) and is accessible within home using either wireless (HomeRF or 802.11b) or wired (Home PNA, Cat 5, even power line) connectivity. Voice traffic will enter the home either as wired (Cat 3) or wireless (cell phones) and distributed within the home using Cat 3 wiring. Entertainment Media enters home either through satellite or cable and is typically distributed in the home using coaxial cable. IEEE 1394 and DVI are also emerging as digital interconnects for clusters of media devices. All of these network environments may be interconnected to form an intranet that may be connected to the outside world by way of the Internet.

The Internet commonly refers to the collection of networks and gateways that utilize the TCP/IP suite of protocols, which are well-known in the art of computer networking. TCP/IP is an acronym for "Transport Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). In the example of FIG. 1, computer 20 can be thought of as the client and computer 10 can be thought of as the server where server 10 maintains the data that is then replicated in the client computer 20.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Illustrative Computer Network Environment

In general, the computer network may comprise both server devices and client devices deployed in a network environment (in a peer-to-peer environment devices may be both clients and servers). FIG. 2 illustrates an exemplary network environment, with server computers in communication with client computers via a network, in which the present invention may be employed. As shown in FIG. 2, a number of servers 21a, 21b, etc., are interconnected via a communications network 160 (which may be a LAN, WAN, intranet or the Internet, or a combination of any of these) with a number of client computers 20a, 20b, 20c, etc. Moreover, communication network 160 may comprise wireless, wireline, or combination wireless and wireline connections.

Thus, the present invention can be utilized in a computer network environment having client computers for accessing and interacting with the network and a server computer for interacting with client computers. However, the systems and methods of the present invention can be implemented with a variety of network-based architectures, and thus should not be limited to the example shown. The present invention will now be described in more detail with reference to an illustrative implementation.

The networking system of the present invention is built on the principle that all objects, devices, and services are equally accessible from anywhere in the virtual network. The network system preferably exposes a consistent platform/programming model that hides the underlying protocol and format differences among objects. According to an aspect of the invention, application contracts should be formed at type level.

In the network system of the present invention, contracts between programmatic endpoints are formed using a universally agreed upon type system. However, it is very easy to confuse syntax with semantics at the type system level because there are many syntactic flavors such a COM, CLR, and Java VM for expressing the same type system concepts. The network system takes the approach that all type systems flavors have the same constructs at the semantic level. Every type system has two aspects: Data aspect and behavior aspect. When an endpoint X sends Message M to endpoint Y to carry out action A, the Message M contains the data useful for carrying out the desired Action A. The data aspect is used for describing Message M and the behavior aspect is used for describing Action A and its relationship with Message M.

Semantic level data constructs that are interesting from building devices and services perspective are:
1. Primitive types such as int, float, string, and so on.
2. Constructed types.
   Each constructed type has
    a. A name
    b. A set of fields
      Each field has
        i. a name
        ii. a type
3. Notion of equivalence
   Two types:
    a. Identity equivalence
    b. subtype equivalence
4. Typed references (aka graphs)
   It captures the notion of having a pointer to a particular type.
5. Arrays
   Each array has
    a. A type
    b. One or more dimensions
    c. Length for each dimension Multiple syntaxes such as IDL, C#, and Java are available to express various objects connected to the network; however, it is important for all of the objects to agree on a single syntax. Preferably, XML Schemas (XSD), enhanced to represent typed references and arrays (bullets 4 and 5 above) and with numerous syntactic restrictions such as elimination of attribute-element distinction for representing fields, provide the canonical syntax to represent the above data constructs. The syntactic restrictions, while not losing any expressive power to represent above data constructs, allow for more efficient parsers and bridges that convert from XML to binary format.

Semantic level behavior constructs that are interesting from building devices and services perspective are:
1. Actions (aka Method)
    Each action has
    a. A name
    b. Optional input data
    c. Optional output data
2. Action grouping (aka interfaces)
    Each grouping has
    a. A name
    b. Zero or more actions
3. Notion of equivalence
    Two types:
    a. Identity equivalence
    b. subtype equivalence Illustrative Type Description Language According to an aspect of the invention, eventing is provided in a type level system. XML Schemas concern themselves with only data aspects and as such are not suitable for representing behavior. Preferably, a simple XML based grammar for representing the above behavior constructs may be used. Accordingly, before describing the details of the eventing system of the present invention, an illustrative Type Description Language is described. Persons of ordinary skill in the art will recognize that the eventing system described herein is equally applicable to systems employing alternate type description systems.

Many devices and services expose properties and utilize eventing. Properties and Events are aggregate constructs built on top the above basic behavior constructs and as such are codification of common use cases. XML grammar defines short forms of expressing property and event constructs as they occur often in practice.

Figure 3:
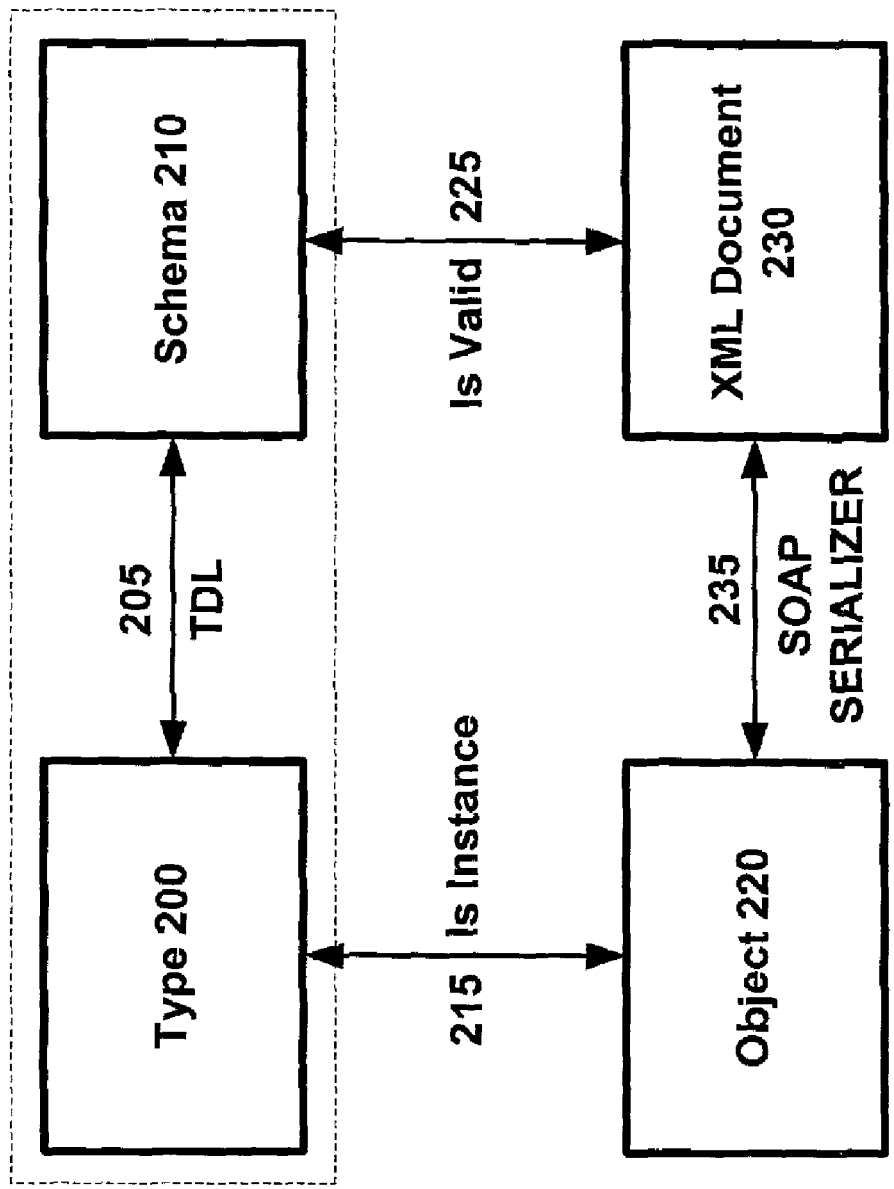
FIG. 3 is a block diagram illustrating that there may be a one to one mapping between a type system and a schema for describing the type system in accordance with the example Type Description Language for use with the present invention.

FIG. 3 captures the essence of the duality achieved by TDL between Object based and XML based views. FIG. 3 illustrates that there is a one to one mapping from an abstract type 200 to a Schema type 210 and vice-versa enabler TDL along pathway 205 in accordance with the present invention. There is also a one to one mapping from an abstract instance 220 to an XML document 230 and vice-versa via a SOAP serializer 235 along pathway 235. The Is Instance operator along pathway 215 between an abstract type 200 and an abstract instance 220 returns TRUE if and only if the Is Valid operator along pathway 225 returns TRUE between the corresponding XML Schema Type and XML Document. TDL is the first interface description language that ensures that both the Is Instance operator and Is Valid operator will return TRUE.

Prior to describing the details of the syntax of TDL below, an exemplary illustration of its use is presented in connection with FIGS. 3A to 3C. FIG. 3A illustrates a C++ programming class construct 300 for a person, wherein the class has strings name, street and city, an integer for zip code and a pointer to another person, the spouse of the person. Exemplary pseudocode 305 of FIG. 3A is the TDL that describes the class person, and in essence abstracts the class into a form that could be duplicated in any type system. Exemplary pseudocode 310 of FIG. 3B describes a service or interface for a device that may wish to make queries to another device or object relating to customer resource management (CRM) system for retrieving information relating to a name of a customer and other related information. Interface IQueryCRM has a method GetInfo that may be used to retrieve information about people. Exemplary implementation of TDL syntax is described in more detail below.

Figure 3C:
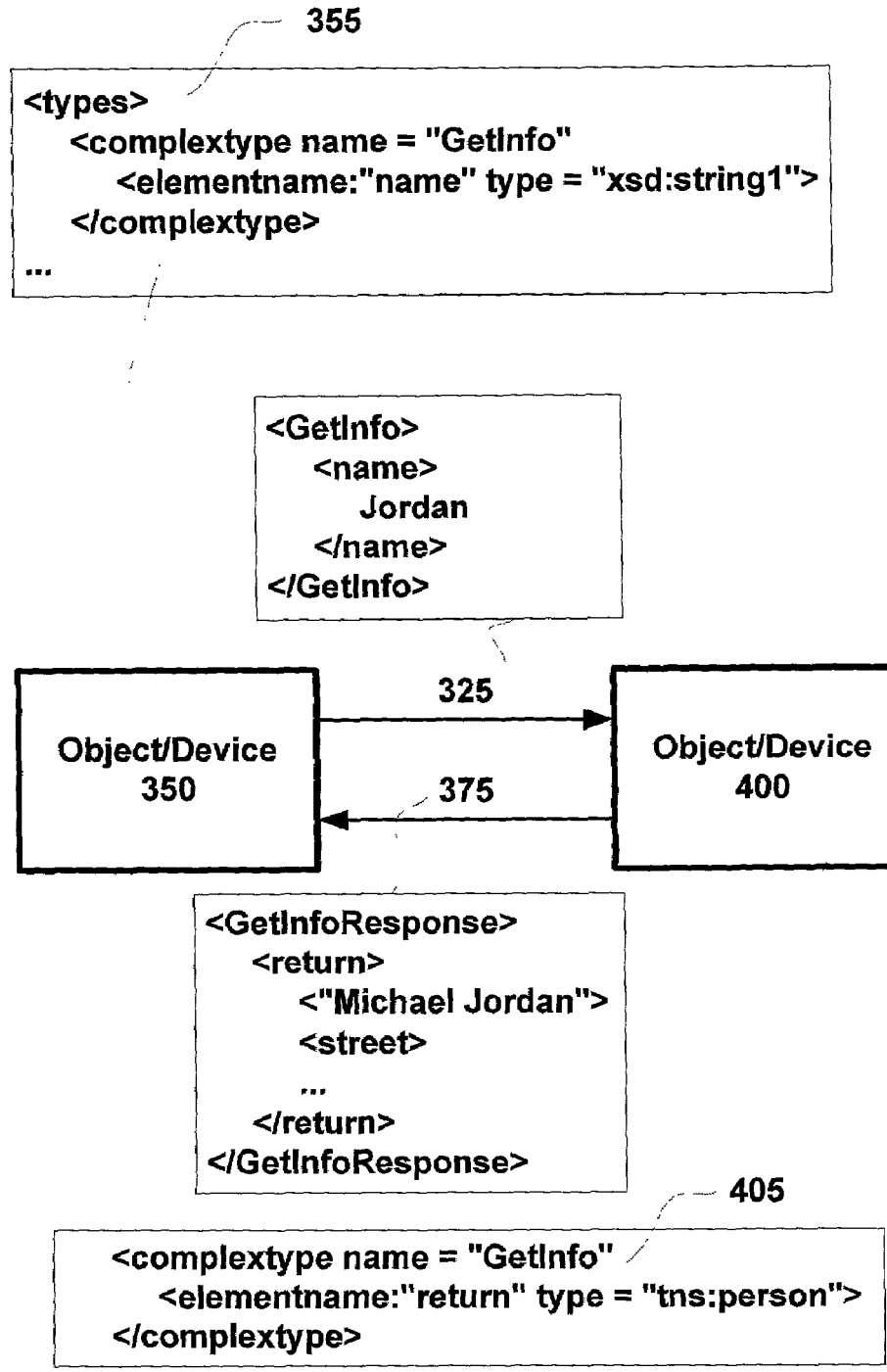

Based upon the above described TDL class description 305 and service 310, if two devices or objects 350, 400 such as illustrated in FIG. 3C, have an understanding of the TDL class description 305 and corresponding service description 310, which TDL 305, 310 may be communicated at any time to devices 350, 400, then the schema 355 for generating a SOAP request by device 350 is as depicted according to TDL and similarly, the schema 405 for generating a SOAP response by device 400 is as depicted according to TDL. With the schemas 355 and 405 defined, a specific request may be made since the mapping is now deterministic according to TDL rules. Thus, the actual message passed, which in an exemplary embodiment is a SOAP request 325, through the communications network calls the method GetInfo searching for a customer named Jordan, and the actual message received in response is SOAP response 375, which returns the customer Michael Jordan and corresponding customer information, which may include street address, city, zip and spouse. Thus, beginning with a type system, and with the TDL transformation syntax or rules described below, a corresponding schema may be developed for describing object or device interfaces or services, and as a result, a common scheme for communicating service descriptions between different objects or devices in a network environment is provided.

Type Description Language (TDL) Base

The present invention is directed to the event system described above in connection with a type definition language. Accordingly, we describe herein an example of a TDL that could provide a foundation for aspects of the eventing system in accordance with the invention. However, a different TDL system could be used to provide the type system necessary to enable the eventing system described herein, as would be apparent to one of ordinary skill in the art. Accordingly, the following TDL description is for illustrative purposes only.

TDL contemplates the inclusion of sufficient information on all the parts of the action signature and supports subtyping. Further, TDL at least in part uses a generic notion of a type system in defining the language. In a distributed environment, TDL enables the specification for the protocol binding for a service's actions including specifying different kinds of binding e.g., SOAP, SMTP etc.

With respect to abstraction, TDL abstracts the first-class concepts of certain distributed environments as first-class primitives. Thus, while generic types may be a basis for TDL, there may also be elements that encapsulate primitive environment-specific concepts.

With respect to precision, TDL enables the ability to state the intention of the action and also distinguish between various actions because the rules for ambiguity occurrence and resolution in TDL are clearly stated as part of the language definition. TDL also allows a single syntactic form for any semantic element. If the semantics for a particular element in a particular environment is different from that of its common notion, TDL resolve such ambiguities by associating the environment semantics with a new and different syntactic element.

With respect to usage, a service description with TDL may be used for at least two primary purposes. A first primary use is for clients to understand what the service offers and how to obtain it. Thus, TDL makes it possible to obtain a service description from an already implemented or already live service. Secondly, a service description may be used as the starting point during the implementation of a service. Thus, TDL makes it possible to translate a service description to metadata in commonly used programming languages. When describing the behavior of a service, TDL supports the following notions: (1) A service is a set of interfaces where each interface can itself be a collection of actions, properties and event sources. (2) A service's properties can be accessed by clients to know the state of the service. (3) TDL enables the expression of exceptions raised by actions. (4) Actions can be request-response or one-way interactions. (5) A service can be a container for multiple services. (6) A service can inherit the behavior from another service and extend it. (7) A service can implement one or more actions. (8) Device taxonomies may be represented as composite interfaces using multiple interfaces in an environment supporting interface inheritance. (9) Creation of new remote references to services is supported.

TDL begins with the following basic outline for a service's behavior:

```
<service>*
    <extends.../>?
    <implements.../>?
    <method.../>*
    <property.../>*
    <eventSource.../>*
</service>
        and the following basic outline for an interface:
<interface>*
    <extends.../>?
    <method.../>*
    <property.../>*
    <eventSource.../>*
</interface>
```

It is also possible to represent child services as read-only properties with constant values, described in more detail below. For data types, TDL uses multiple schema namespaces and uses XSD types and soap-encoding types directly wherever possible. TDL defines a schema namespace to cover TDL specific data types. A TDL document instance limits its use of XSD schemas to a small feature set like simple and complex type definitions. TDL enables the creation of type definitions by simply filling in templates defined by TDL for various types, such as structs and classes.

In one embodiment, a layered approach is applied: Layer one is the minimum set of data types that are supported for the representation of a service's behavior. These constructs are direct mappings of commonly used types or types which represent special primitives specific to an environment. Layer one specifies enough document structure to serve as the basis for representing particular type systems, such as ECMA.

Layer two includes constructs that express the semantics of a particular type system. These constructs may be layered on top of layer one using annotations and global attributes. For example, TDL in the context of ECMA, for integration with the ECMA type system, is described in more detail below.

TDL accommodates complex types like classes that have both data as well as behavioral aspects. For example, a class may contain fields that are data members and methods that are part of the actions.

When including data types in layer one of the TDL description, for common primitive types such as int, float, and long (defined as part of ECMA), the data types are represented using XSD simple types. TDL also supports enumerations expressed as pairs of names and integer values. Bit fields represented as a collection of names corresponding to valid bit positions are also supported. Classes are also supported, and in this regard, a distinction is made when the class is defined as a value type i.e., it cannot be referenced and can only be embedded, versus when it is a reference type and can be part of a graph like a cycle.

Class members can themselves be of complex types. With TDL, it is also possible to specify the value associated with const class members. Arrays of simple and complex types are also supported. TDL also enables the specification of multi-dimensional arrays, jagged arrays, and sparse arrays. For certain peer to peer environments, event source may be added as a primitive type since event source is a core functionality for certain environments.

While defining certain data types, TDL also normalizes them by applying these core principles: The difference between single-reference types and multi-reference types e.g., structs vs. classes, is maintained. Multiple ways of representing fields, such as attributes vs. elements, are avoided. For example, in an exemplary implementation, element representation is used instead of attribute representation. This makes for standard implementation, and avoids the possibility of two different interfaces written by two different developers. Global element name-type name distinctions are also avoided. In this regard, for every type, TDL defines and supports a single global element name in its schema namespace that has the same name as the type. Additionally, the use of element substitution groups while representing fields of structs or classes is avoided. Element substitution groups are used, however, to represent the elements of composite types without fields, e.g. collections, arrays. Choice grouping constructs are also avoided. Subtyping is utilized to achieve functionality provided by subtyping with a slight loss of strong typing at schema validation time.

The above normalization rules make the syntax for representing types via TDL simple, fixed, and obvious. Beyond the specification of actions and data types, TDL also has a mechanism for specifying constant values referred to by actions and data types.

While describing the generic types included in TDL herein, various programming examples are used for illustration purposes only. In particular, the various programming examples utilized herein do not imply that TDL derives the semantics of the type being described from the programming language of the examples. Instead, all data types supported by the base TDL definition are generic and commonly available across languages popular today.

The following description and examples provide exemplary illustration of the structure of a TDL Document. Given the design goals and the underlying rationale of TDL described above, the following structure for describing service behavior is provided by TDL:

```
<tdl:TDL targetNamespace="uri"?>
    <tdl:import namespace="uri" location="uri"? /> *
    <tdl:documentation>...</tdl:documentation> ?
    <tdl:extension>...</tdl:extension> *
    <tdl:actions> ?
        <tdl:documentation.../> ?
        <tdl:extension>...</tdl:extension> *
    <tdl:service> *
        <tdl:documentation.../> ?
        <tdl:extension>...</tdl:extension> *
        <tdl:name>...</tdl:name>
        <tdl:extends>...</tdl:extends> ?
        <tdl:implements> ?
            <tdl:documentation.../> ?
            <tdl:interface>...</tdl:interface> *
        </tdl:implements>
        <tdl:methods> ?
            <tdl:method paramOrder="..."?> *
                <tdl:documentation.../> ?
                <tdl:extension>...</tdl:extension> *
                <tdl:name>...</tdl:name>
                <tdl:in>...</tdl:in> ?
                <tdl:out>...</tdl:out> ?
                <tdl:fault>...</tdl:fault> ?
            </tdl:method>
            <tdl:oneWayMethod> *
                <tdl:documentation.../> ?
                <tdl:extension>...</tdl:extension> *
                <tdl:name>...</tdl:name>
                <tdl:in>...</tdl:in> ?
            </tdl:onewayMethod>
        </tdl:methods>
        <tdl:properties> ?
            <tdl:property>
                <tdl:documentation.../> ?
                <tdl:extension>...</tdl:extension> *
                <tdl:name>...</tdl:name>
                <tdl:type>...</tdl:type> ?
                <tdl:accessor>...</tdl:accessor> ?
            </tdl:property>
        </tdl:properties>
        <tdl:eventSources> ?
            <tdl:eventSource> *
                <tdl:documentation.../> ?
                <tdl:extension>...</tdl:extension> *
                <tdl:name>...</tdl:name>
                <tdl:type>...</tdl:type> ?
            </tdl:eventSource>
        </tdl:eventSources>
        <tdl:bindings> ?
            <tdl:documentation.../> ?
            <tdl:extension>...</tdl:extension> *
            <tdl:binding>...</tdl:binding> *
        </tdl:bindings>
    </tdl:service>
    <tdl:interface>*
        <tdl:documentation.../> ?
        <tdl:extension.../> *
            <tdl:name>...</tdl:name>
            <tdl:extends.../> ?
                <tdl:documentation.../> ?
                <tdl:interface>...</tdl:interface> *
            </tdl:extends>
            <tdl:methods.../> ?
            <tdl:properties.../> ?
            <tdl:eventSources.../> ?
    </tdl:interface>
</tdl:actions>
<tdl:types> ?
    <tdl:documentation../> ?
    <tdl:extension.../> *
    <tdl:schema.../> *
</tdl:types>
<tdl:values> ?
    <tdl:documentation..../> ?
    <tdl:extension.../> *
    <tdl:anyValueElement>...</tdl:anyValueElement> *
</tdl:values>
<tdl:bindings.../> ?
```

```
        <tdl:TDL.../>*
</tdl:TDL>
    For example, a service may be implemented using the following class:
namespace Devices.Sony {
    struct ChannelRange {
        int low;
        int high;
    }
    class Channel {
        string GetGuide ();
    }
    class sonyDE545Tuner : ConnectableService, ITuner, IAVProgramSource {
        Channel currentChannel;
        ChannelRange range;
    }
}
    With TDL, this service be represented as:
<TDL targetNamespace="http://www.sony.com/TDL/Devices.Sony/SonyAssembly"
        xmlns:tns="http://www.sony.com/TDL/Devices.Sony/SonyAssembly"
xmlns:ctns="http://www.sony.com/TDL/Devices.Sony/SonyAssembly#Channel"
        xmlns:sbns="http://schemas.microsoft.com/ServiceBus/framework"
        xmlns:tdl="http://schemas.microsoft.com/tdl"
        xmlns="http://schemas.microsoft.com/tdl">
    <actions>
        <service>
            <name>Channel</name>
            <methods>
                <method>
                    <name>GetGuide</name>
                    <in>ctns:GetGuide</in>
                    <out>ctns:GetGuideResponse</out>
                </method>
            </methods>
        </service>
        <service>
            <documentation>Describes a SonyDE545 tuner</documentation>
            <name>SonyDE545Tuner</name>
            <extends>sbns:ConnectableService</extends>
            <implements>
                <interface>sbns:ITuner</interface>
                <interface>sbns:IAVProgramSource</interface>
            </implements>
        </service>
    </actions>
    <types>
        <schema targetNamespace=
                "http://www.sony.com/TDL/Devices.Sony/SonyAssembly#Channel"
                xmlns:tns=
                "http://www.sony.com/TDL/Devices.Sony/SonyAssembly#Channel"
xmlns:sbns="http://schemas.microsoft.com/ServiceBus/framework"
                xmlns:tdl ="http://schemas.microsoft.com/tdl"
                xmlns="http://www.w3.org/.../XMLSchema">
            <complexType name="GetGuide">
                <all/>
            </complexType>
            <complexType name="GetGuideResponse">
                <all>
                    <element name="Result" type="string"/>
                </all>
            </complexType>
        </schema>
        <schema
          targetNamespace="http://www.sony.com/TDL/Devices.Sony/SonyAssembly"
                xmlns:tns="http://www.sony.com/TDL/Devices.Sony/SonyAssembly"
xmlns:sbns="http://schemas.microsoft.com/ServiceBus/framework"
                xmlns:tdl="http://schemas.microsoft.com/tdl"
                xmlns="http://www.w3.org/.../XMLSchema">
            <complexType name="ChannelRange">
                <all>
                    <element name="low" type="int"/>
                    <element name="high" type="int"/>
                </all>
            </complexType>
            <complexType name="SonyDE545Tuner">
                <all>
                    <element name="currentChannel" type="tdl:reference"
                        tdl:refType="Channel" nillable="true"/>
                    <element name="range" type="ChannelRange"/>
                </all>
```

```
                </complexType>
            </schema>
        </types>
</TDL>
    For further example, if the ITuner interface had been independently standardized with the
following definition:
        public interface ITuner {
            bool Power { get; set; }
            bool Mute { get; set; }
            bool Change (int id) {...}
        }
        the ITuner interface could be described as below with TDL:
<TDL targetNamespace="http://schemas.microsoft.com/.../ServiceBus/Framework"
xmlns:tns="http://schemas.microsoft.com/.../ServiceBus/Framework"
            xmlns:tdl="http://schemas.microsoft.com/tdl"
            xmlns="http://schemas.microsoft.com/tdl" />
    <interface>
        <name>ITuner</name>
        <methods>
            <method>
                <name>Change</name>
                <in>tns:Change</in>
                <out>tns:ChangeResponse</out>
            </method>
        </methods>
        <properties>
            <property>
                <name>Power</name>
                <type>xsd:boolean</type>
                <accessor>all</accessor>
            </property>
            <property>
                <name>Mute</name>
                <type>xsd:boolean</type>
                <accessor>all</accessor>
            </property>
        </properties>
    </interface>
    <types>
        <schema
targetNamespace="http://schemas.microsoft.com/.../ServiceBus/Framework#ITuner
            xmlns="http://www.w3.org/.../XMLSchema" />
            <complexType name="Change">
                <all>
                    <element name=id" type="int"/>
                </all>
            </complexType>
            <complexType name="ChangeResponse">
                <all>
                    <element name=ChangeResult" type="boolean"/>
                </all>
            </complexType>
        </schema>
    </types>
</TDL>
```

TDL elements include actions, services, interfaces, methods, properties and event sources. The actions element includes one or more service and interface definitions. The actions element is a wrapper element that aggregates all service and interface definitions into a single place.

A service element represents the actions of a concrete entity, which could be a software application or a device. The service element is a named collection of interfaces, methods, properties and event sources that the clients of the service can use. A service carries the implementation of all the interface contracts it declares. A service can inherit from another service, in which case it asserts the implementation of the contracts of the base service.

A service element further has name, extends, implements, methods, properties, eventSources and bindings elements. With respect to the name element, the service name may be chosen to be unique across all services defined in the TDL target namespace. The extends element indicates the base service whose implementation the service inherits. The implements element lists all the interfaces that the service implements. The methods element includes one or more methods that the service implements. The properties element includes one or more properties implemented by the service. The eventSources element describes one or more of the event sources the service supports. The bindings element section indicates the location of one or more services.

Like a service, an interface element is also a named collection of interfaces, methods, properties and event sources, but unlike a service, an interface element is an abstract entity and has no implementation backing it. The primary use of an interface is to ease the specification of contracts, which are then implemented as services.

An interface has name, extends, methods, properties and eventSources elements. The interface name may be chosen to be unique across all interfaces defined in the TDL target namespace. The extends element lists all the interfaces that the interface implies. The extends element can be used to described a composite interface. The methods element includes one or more methods that the service implements. The properties element includes one or more properties implemented by the service. The eventSources element describes one or more of the event sources the service supports.

The methods element includes one or more methods defined by a service or an interface. The methods element is a wrapper element that aggregates all method definitions into a single place. The methods element includes one or more of method and oneWayMethod elements. A method element describes a request response method. A oneWayMethod element describes a one-way method, which is a method that has no return/out values and can execute asynchronously with respect to its caller. In other words, one-way methods support fire and forget semantics.

The properties element includes one or more properties defined by a service or an interface. The properties element is a wrapper element that aggregates all property definitions in a single place.

The eventSources element includes one or more event sources defined by a service or an interface. The eventSources element is a wrapper element that aggregates all event sources definitions in a single place.

As one of ordinary skill in the programming arts can appreciate, a method is a named contract that can be invoked independently with a set of zero or more input parameters. A method can return zero or more result values and raise zero or more faults.

In accordance with the invention, a TDL method has name, in, out and fault elements. The method name may be chosen to be unique across all methods, properties and event sources encapsulated within the enclosing service or interface. The in element refers to the composite type containing all the input parameters of the method. The out element refers to the composite type containing all the output parameters of the method. The fault element refers to the composite type containing types of all the faults returned by the method.

In accordance with the invention, a method may have a paramOrder attribute. The paramOrder attribute is an optional attribute that can be used to indicate the order of the parameters.

The composite types referenced in the method declaration can be resolved by defining them in the types section as illustrated below:

```
<complexType name="method">
    <all>
        <element name="in/inout parameter name" type="parameter type"/>
        ...
    </all>
</complexType>
<complexType name="methodResponse">
    <all>
        <element name="out/inout parameter name"
            type="parameter type"/>
        ...
    </all>
</complexType>
<complexType name="methodFault">
    <all>
        <element name="exception field" type="exception field type"/>
        ...
    </all>
</complexType>
```

Since these composite types are implicitly created by TDL, they are defined in a separate schema namespace to avoid collisions. The name of the schema namespace is created using the current target namespace followed by the interface or service name as the URL fragment:

"<current target namespace>#<service or interface name>"

For example, given a method:
string GetString (int);
defined inside a service "MyService" in the target namespace:

```
<TDL targetnamespace="http://www.mydomain.com/NSAssem/xx.yy/MyAssembly">
the parameter types GetString and GetStringResponse would be defined in
<schema targetnamespace=
"http://www.mydomain.com/NSAssem/xx.yy/MyAssembly#MyService">
```

Since separate composite types are defined to represent the in and out parameters of a method respectively, it might not be possible to restore the original order by looking at the elements of these composite types.

Thus, to indicate the parameter order, a global attribute paramOrder is defined in the tdl namespace that can contain a string that indicates the parameter names in the correct order, as per the following:

```
<attribute    name="paramOrder"    type="xsd:string"
    form="qualified"/>
```
For instance, given the above definitions, a method func (a1 in, a2 inout, a3 in, a4 out) translates to the following using TDL:

```
<method tdl:paramorder="a1,a2,a3,a4" . . . />
```

A one-way method is a named contract that can be invoked independently with a set of zero or more input parameters. A one-way method does not return any value, but rather follows a pattern of fire or call and then forget.

With TDL, a oneWayMethod has name and in elements. The method name may chosen to be unique across all methods, properties and event sources encapsulated within the enclosing service or interface. The in element refers to the composite type containing all the input parameters of the method. As with the case of a non-oneWayMethod, the composite type referenced in the one-way method declaration can be resolved by defining it in the types section.

As one of ordinary skill in the programming arts can appreciate, a property defines a named value and the methods to access the value. The named value is of a particular type and the property may support get, set or all methods.

A TDL property has name, type and accessor elements. The property name may be chosen to be unique across all the methods, properties and event sources encapsulated within the enclosing service or interface. The property type is a qualified name referring to a type definition present in a schema namespace. The TDL type section can be used to define the property type. The accessor attribute defines the mode of operations allowed on the property. Valid values are get, set or all.

An event source defines a typed entity that supports subscription. When the event occurs, a value of the type is returned to the subscriber. A TDL EventSource has name and type elements. The event source name may be chosen to be unique across all the methods, properties, and event sources encapsulated within the enclosing service or interface. The event type is a qualified name referring to a type definition present in a schema namespace. The TDL types section can be used to define the event type.

The bindings section can be used to specify the location of one or more services. The bindings section may include one or more binding elements. Bindings can be specified as part of a service definition or outside of the service definition. When specified as part of the service definition, bindings can only be applied to the enclosing service. Outside the service definition, bindings can be specified for any service.

TDL defines a global element called binding in the tdl schema namespace. Custom binding elements can be specified using substitution groups with binding as the head element. The base binding element has an optional serviceType attribute of type qname that can be used to specify TDL service definition to which the binding applies. The serviceType attribute is used when the binding is specified outside the service definition.

In one embodiment, TDL bases its data types on XSD and SOAP-ENC XML schema namespaces. TDL extends, restricts or annotates them to define the TDL schema namespace. This includes generic type elements, primitive types defined by particular peer-to-peer environments, such as a peer-to-peer network for the home or business enterprise, as well as annotations and global attributes required for representing the metadata of generic types and TDL elements. TDL types are described in more detail below. Every element that is defined may be chosen to have a unique name in the context of its target schema namespace.

The extensions section allows one or more extension elements to appear within it. An extension element is allowed at almost any of the points in TDL. Further, TDL supports attribute extensions on all the elements defined by TDL. TDL defines a global element called extension in the tdl schema namespace for the extension element. Custom extension elements can be specified using substitution groups with extension as the head element.

The values section allows one or more instance values to appear within it. The values section enables the specification of constant values of complex types in the other TDL sections, illustrated below in more detail. TDL defines a global element in the tdl schema namespace called any ValueElement. Custom value elements are specified using substitution groups with this global element as the head element.

The import element enables the use of definitions from other TDL or XSD namespaces in the current TDL target namespace. The Documentation element is allowed inside by all TDL elements. The documentation element may include any text or XML elements intended to improve the readability of the TDL document.

TDL Data Types include simple types and constructed types. With respect to simple types, the TDL Base definition directly uses the primitive types contained in the XSD schema namespace for the primitive types defined as part of ECMA submission. Layered Extensions can be built on top of these primitive types by restricting their value sets if necessary. With respect to constructed types, a TDL enumeration type e.g., enum type, is a value type based on one of the integer primitive types. A TDL enumeration type consists of a set of named elements. Values of an enumeration type typically consist of a consecutive range of integers starting at zero. It is also possible to specify the integer value associated with a specific element name, in which case the values of successors to that element are successors of that integer value.

The TDL description described in detail above, provides one framework for a type level system in which the present invention may operate to provide querying, eventing, proxy services, and so. Accordingly, further details of the querying and eventing within that framework are provided below. The pseudocode examples may be converted in accordance with the rules above for transmission within the distributed network.

Querying

Figure 4:
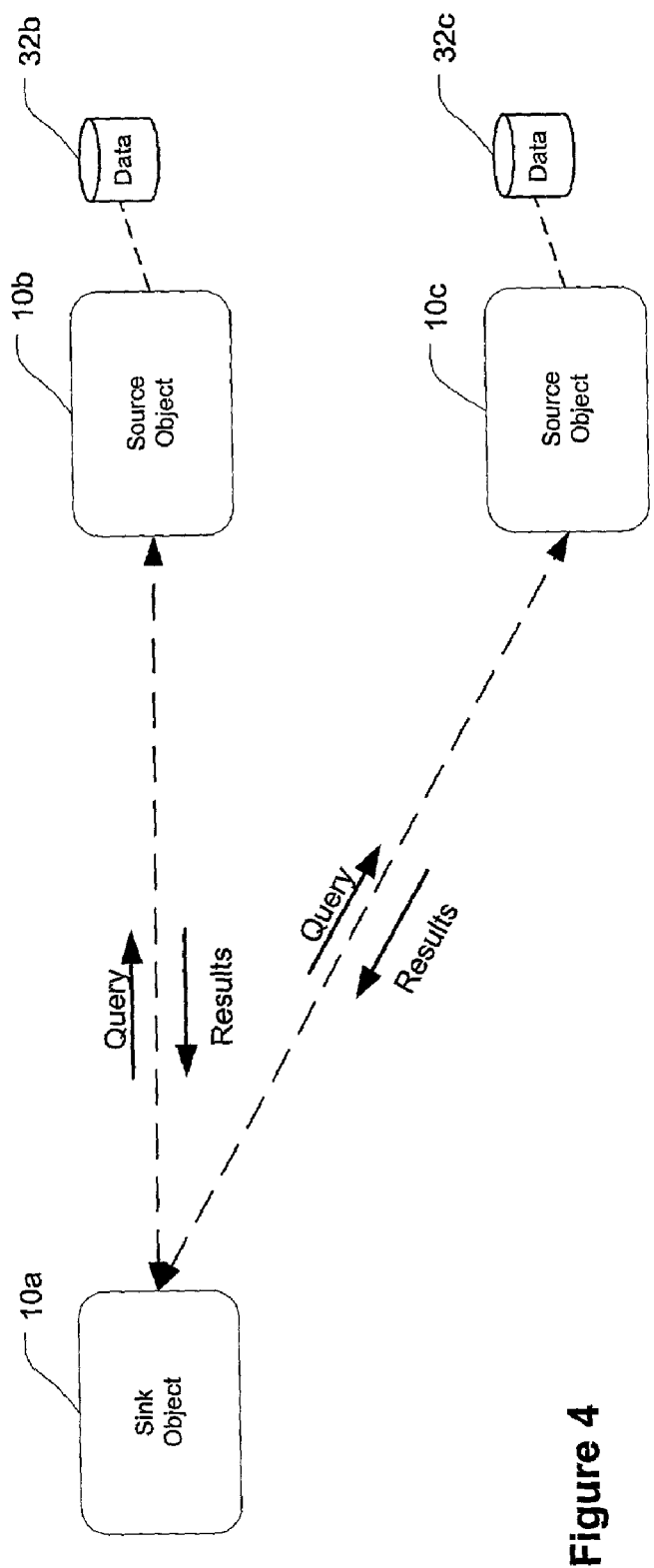
FIG. 4 is an illustration of querying objects within the distributed computer network.

In a distributed computing environment, it is beneficial for various computing objects in the system to have the capability to discover various objects within the distributed environment. One way for objects to perform such discovery is by way of a query system. FIG. 4 illustrates digital objects 10a, 10b, and 10c wherein sink object 10a queries the data 32b, 32c maintained by source objects 10b and 10c. In this distributed computing environment, sink object can merely broadcast a query to all objects in the network and have each source object 10b, 10c perform the local query, and transmit the results back to the requesting sink object 10a by unicast. In this way, sink object 10a can discover resources and filter resources on the network such as the resources maintained by source objects 10b, 10c.

Eventing

Figure 5:
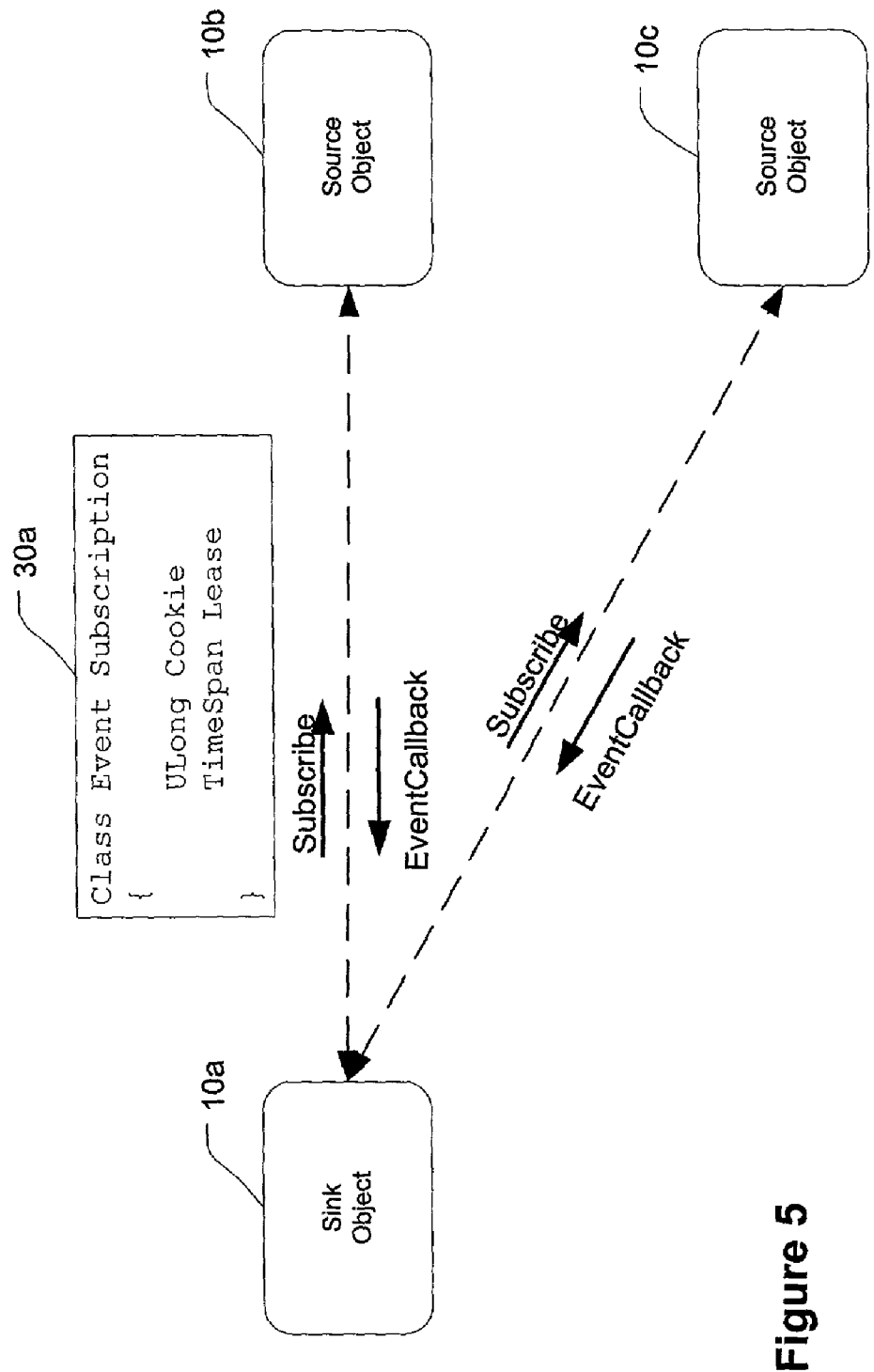
FIG. 5 is an illustration of eventing within the distributed computer network.

After discovering resources in the system, it is advantageous for the objects to be able to request notification based on events that are controlled by other objects and resources in the distributed environment. According to an aspect of the invention, objects in the communications network 160 can subscribe (i.e. become event sinks) to events sourced by other objects in the communications network 160. In this capacity, the sink objects subscribe, revoke or renew subscriptions with various ones of the source objects, and set filters on the events being subscribed to. FIG. 5 illustrates an example of how the eventing system functions at a high level. A sink object 10a subscribes to one or more source objects 10b, 10c. After subscribing, the sink object receives event notifications when the subscribed to events are fired at the source object 10a, 10b.

An event is a named entity that has a type associated with it. It also has a timestamp (UTC time) of when the event was generated. The timestamp can be used to partially order events from different sources. The event takes the form:

```
IEvent
{
    Time   timestamp;
}
```

An event source is a service object that raises one or more events. It supports the following interface:
public interface IEventSource

```
{
    string[ ] EventNames { get; }
    Type EventType(string name);
    EventSubscription Subscribe(IService owner, IEventSink sink,
string name, Query filter, string context);
    Void UpdateFilter(ulong subscriptionID, Query filter);
    void Revoke(ulong subscriptionID);
    TimeSpan Renew(ulong subscriptionID);
}
```

The event source has an "EventNames" property that can be queried and returns a list of the names of all the events supported by the EventSource.
 string[ ] EventNames {get;}

Event Type
Given an event name, this method returns the type of the event.
 Type EventType(string eventName);

Subscribe
An event sink can subscribe to an event identifying it by name. It is possible to set filter events at the source by supplying a filter object during subscription. The filter is a standard query object that can select an event by inspecting its value set. The event sink can indicate its owning service as part of its subscription request if it wishes the liveness of the owning service to be tracked by the source. Subscribing to an event returns registration information on the event.

Registration data also contains the initial lease granted to the subscription by the event source. The subscriber should renew his subscription before the lease expires by calling Renew method on the event source. The subscriber should utilize the "Renew" method on the "IEventSource" interface to extend the lease before the current lease expires. The "Renew" method returns a new lease that may be different from the current lease.

Another piece of registration data is the opaque "subscriptionID" returned. This identifies the subscription and can be used to revoke or renew the subscription later.

```
        EventRegistration Subscribe(string eventName, IEventSink sink,
IService owningService, Query eventFilter);
    public struct EventRegistration {
        public Type eventType;       // event type
```

-continued

```
        public IEventSource source;    // event source
        public TimeSpan initialLease;  // initial lease
        public ulong subscriptionID;   // opaque subscriptionID
    }
```

UpdateFilter
After a subscription has been created, an event sink can change the filter object for the subscription by identifying it with the subscriptionID.
 void updateFilter(ulong subscriptionID, Query filter);

Revoke
An event sink can revoke its subscription to an event identifying it by the subscriptionID.
 void Revoke(ulong subscriptionID);

Renew
An event sink can renew its subscription to an event identifying it by the subscriptionID.
 TimeSpan Renew(ulong cookie, TimeSpan requestedLease);

Event Sink
An event sink subscribes to events of a particular type from one or more sources. It supports the following interface:

```
IEventSink
{
    [Oneway]
    void EventCallback(ulong seqnum, string subscriptionContext,
IEventSource source, IEvent[ ] filteredEvents);
    [Oneway]
    Void RevokeCallback(string subscriptionContext);
}
```

EventCallback
This is a one-way method that will be invoked by the event source when it wants to send an event to its subscriber sink. As the events are delivered using a one-way callback method that can arrive at the sink out of order, event source passes a sequence number that can be used by the sink for FIFO ordering of events from the source. The sequence number starts at zero and monotonically increases to the max ulong value before wrapping around. It is maintained by the event source on a per subscription basis. The subscriptionContext parameter supplied by the subscriber as part of the initial subscription is passed by the source in the callback so as to allow the sink to establish its context for the events being delivered.
 [OneWay]
 void EventCallback(ulong seqNum, string subscriptionContext,
   IEventSource source, IEvent[ ] filteredEvents);

An important part of the eventing mechanism is the ability of the event source to transmit initial state to the event sink. It is recommended, and a good design practice, that events convey absolute values such as the current ask price for a stock symbol. Such an eventing design allows the sink to smoothly recover from event delivery failures arising out of factors such as network congestion. Such a design needs no special mechanisms for delivery of the initial state as every event update conveys new state that is independent of previous state.

However, there may be a small number of problem spaces that mandate a design where events need to convey relative (delta) values. The following are the various alternatives for delivery of initial state:
1. The initial state is returned in the response to the subscription message.
2. Both the initial state and the delta state is conveyed as events. There are two sub-cases here for distinguishing initial event from delta events.
   a. The absolute state is always delivered with a sequence number of 0.
   b. The delivered event type distinguishes whether it is conveying absolute state or delta state. This distinction can be achieved by creating two event types that derive from a common event base type, one for conveying absolute value and another for conveying delta value. It can also be achieved by carrying a flag as part of the event that distinguishes the state carried by the event as either the absolute value or delta value.

This eventing specification recommends 2(b) as the preferred/recommended mechanism for supporting designs that require delivery of delta events. It recommends that the first event callback made by the event source to the event sink after the establishment of a subscription convey the initial state as an absolute event. Subsequent events may convey delta values. It also recommends that event source periodically send the events conveying absolute values to synchronize the state potentially maintained by the event sink.

Note that the callback contains one or more events from a particular source. This happens when the events are collated or buffered by the source or an intermediary and returned to the sink in one-shot. The operation of the intermediary is described below in connection with FIG. 6.

There are two levels of granularity at which events can be ordered by a sink: Within the events of a particular type, the sequence number can be used to completely order the events in order of occurrence; events from different sources can be partially ordered by their timestamps.

Additionally, when events are fired from the source, no response is generated by the sink per the semantics of one-way methods. Accordingly, there is no confirmation that the event was received by the sink.

When an event source wants to revoke its client subscription before the lease expires, it should utilize the "Revoke-Callback" method to inform its sink that the subscription has been revoked. The subscriptionContext parameter supplied by the subscriber as part of the initial subscription is passed by the source in "RevokeCallback" so as to allow the sink to establish the context for the subscription being revoked.

Figure 6:
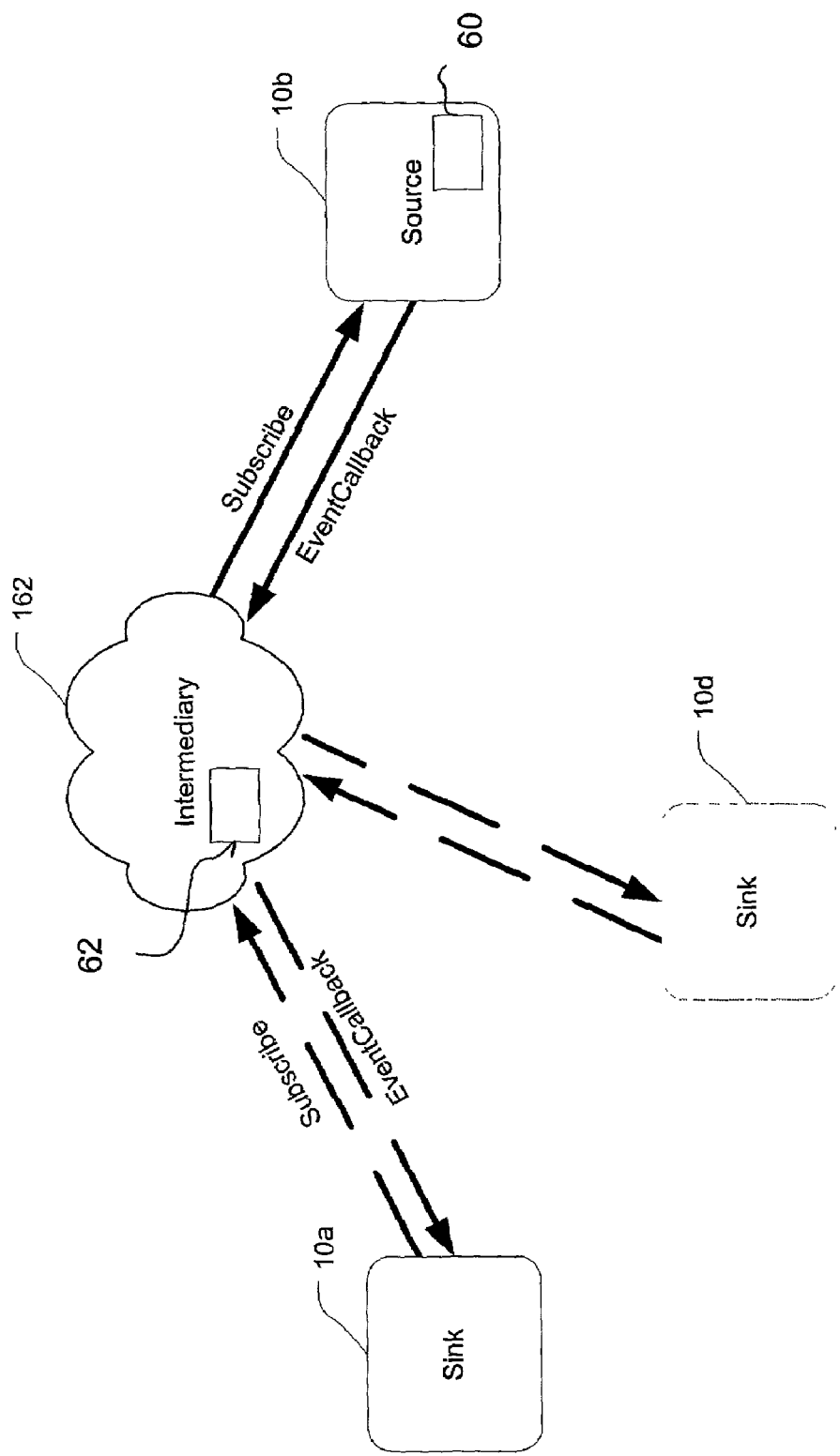
FIG. 6 is an illustration of using a proxy to perform eventing in accordance with an aspect of the invention; and, FIG. 7 is a block diagram of an exemplary computing environment in which aspects of the invention may be implemented.

[OneWay]
Void Revokecallback(string subscriptionContext);

FIG. 6 illustrates a further aspect of the inventing system of the present invention. An object 10a may subscribe to an event source by way of an intermediary 162. The subscription may request that the event source provide certain types of events by providing a filter 60. This functionality allows the event source to provide events only when the data filtered by filter 60 are met. Additionally, by using intermediary 162, further control over the eventing could be gained. For example, intermediary 162 could be set up to pass events to sink 10a for a predefined time period and to sink 10d for a second predefined time period. Accordingly, if a user uses one type of digital device for one portion of the day and a different digital device during a different portion of the day, the intermediary can properly forward the events to the appropriate digital device.

In general, intermediary 162 allows a user to set a proxy for events and have the intermediary provide a much richer set of filtering and event forwarding criteria. Events could be filtered by intermediary 162 based on the location of a user, time of day, capabilities of a users currently available device and so on.

Additionally, the intermediary could handle different formatting requirements of each different digital device. For example, if digital device 10a was a desktop computer, such a digital device is capable of providing a comprehensive experience for receiving and displaying eventing information. On the other hand, if digital device 10d was cell phone, the capabilities would be much more restricted. The intermediary could make the necessary adjustments to the event data being provided.

Figure 7:
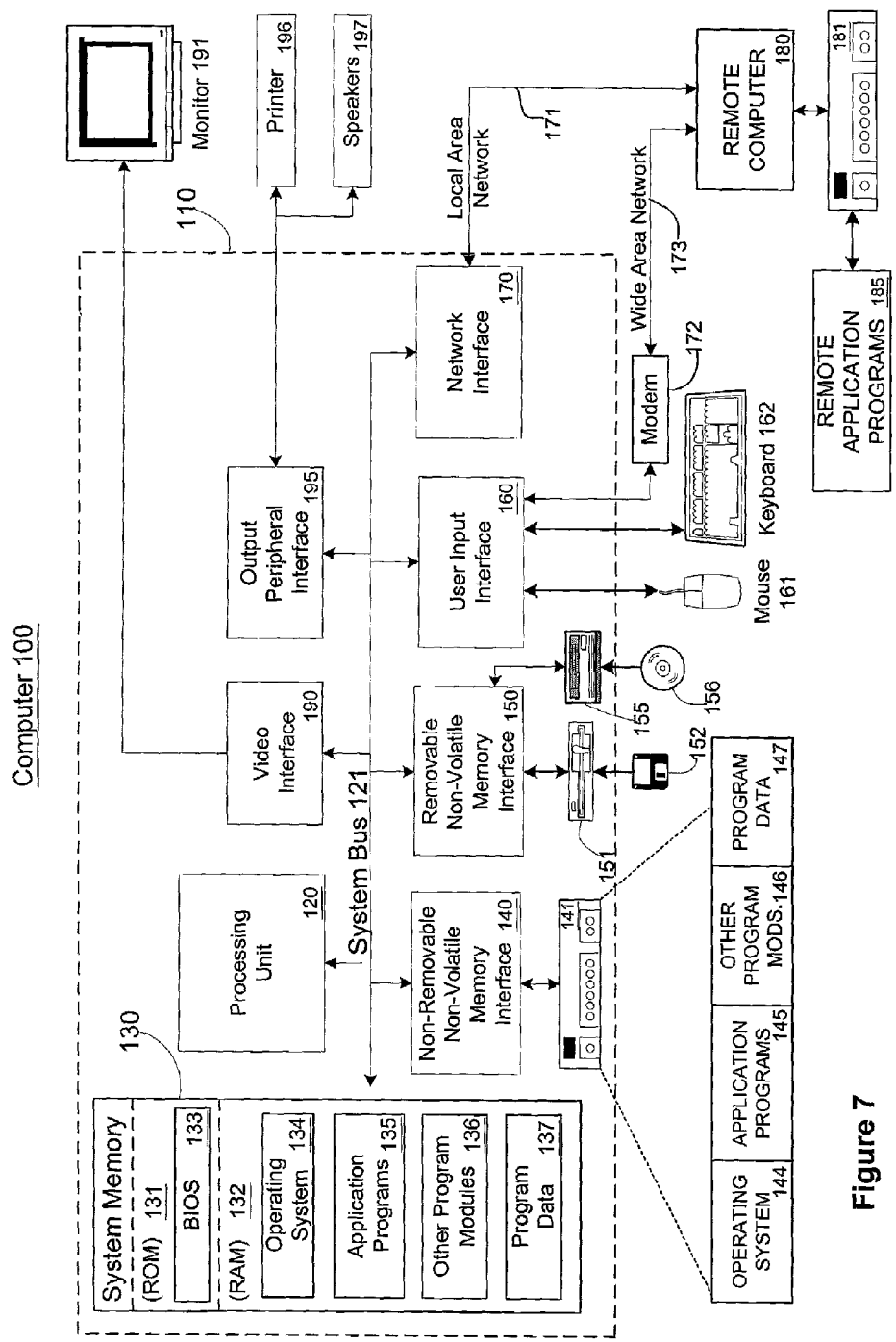

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

Computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, DVD players, VCRs, home appliances, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for managing event notification in a communications network, comprising:

subscribing to a first event source to create a first event subscription;

receiving at least two event messages via the communications network, each event message comprising a subscription based-sequence number and a time stamp from the first event source when events occur at the first event source;

determining the order of events within the first event source on the basis of the subscription based-sequence number within the at least two event messages; and subscribing to a second event source to create a second event subscription;

receiving another at least two event messages via the communications network, each event message comprising a subscription based-sequence number and a time stamp from the second event source when second events occur at the second event source;

determining the order of events within the second event source on the basis of the subscription based-sequence number within the another at least two event messages from the second event source;

ordering the events from the second event source with respect to the first event source on the basis of the time stamp within each of the at least two event messages from the first event source and the another at least two event messages from the second event source; and revoking the first event subscription for the first event source.

2. The method as recited in claim 1 wherein the at least two event messages are described with a Type Description Language.

3. The method as recited in claim 1 wherein the at least two event messages are delivered as SOAP messages.

4. The method as recited in claim 1 wherein the at least two event messages can convey both absolute and relative values.

5. The method as recited in claim 1 wherein the first event source defines events raised by the first event source as a name-type pair.

6. The method as recited in claim 1 wherein the first event source and an event sink are identified using standard types IEventSource and IeventSink, respectively.

7. The method as recited in claim 1 wherein the first event source supports filtering of events raised by the first event source.

8. The method as recited in claim 1 wherein a subscriber can establish an event filter as part of an initial subscription.

9. The method as recited in claim 1 wherein a subscriber can update an event filter established as part of an initial subscription.

10. The method as recited in claim 2 wherein the Type Description Language comprises a markup language.

11. The method as recited in claim 1 wherein the first event source messages are one-way messages.

12. The method as recited in claim 1 wherein the first event subscription is made to the first event source by way of an intermediary.

13. The method as recited in claim 1 wherein the at least two event messages is received through an intermediary.

14. The method as recited in claim 1 wherein the first event subscription is defined in a type description language.

15. The method as recited in claim 10 wherein the Type Description Language comprises a one to one mapping to an extensible markup language.

16. The method as recited in claim 1 wherein the first event source is an object on a digital device.

17. The method as recited in claim 1 comprising setting a lease term after an expiration of which the first event source discontinues transmission of at least two event messages.

18. The method as recited in claim 17 comprising sending a renewal message to renew the lease term.

19. The method as recited in claim 1 wherein the network is an intranet.

20. The method as recited in claim 1 wherein the network is the Internet.

21. A distributed system comprising:
a first digital device comprising a processor;
a second digital device capable of communicating with the first digital device by way of a computer network,
said first digital device comprising instructions that, when executed by the processor, cause the first digital device to:
subscribe to a first event source operating on the second digital device whereby the first digital device receives event notification messages each comprising a subscription based-sequence number and a time stamp from the first event source when events occur on the first digital device;
determine the order of events on the basis of the subscription based-sequence number within the at least two event messages;
subscribe to a second event source to create a second event subscription;
receive another at least two event messages each comprising a subscription based-sequence number and a time stamp from the second event source when second events occur at the second event source;
determine the order of events within the second event source on the basis of the subscription based-sequence number within the another at least two event messages from the second event source;
order the events from the second event source with respect to the first event source on the basis of the time stamp within each of the at least two event messages from the first event source and the another at least two event messages from the second event source.

22. The system as recited in claim 21 further comprising an intermediary device in communication with the first digital device and the second digital device whereby the event notification messages are routed to the intermediary device and thereafter forwarded to the first digital device.

23. The system as recited in claim 21 wherein the event notification messages are constructed in a type description language.

24. The system as recited in claim 23 wherein the type description language has a one to one mapping to an extensible markup language.

25. The system as recited in claim 21 wherein the first digital device determines the order that events occurred on the second digital device by way of the sequence number.

26. The system as recited in claim 21 wherein the event notification messages are one-way messages.

27. The system as recited in claim 21 wherein the first digital device and the second digital device are coupled to an intranet.

28. The system as recited in claim 22 wherein the first and second digital device are coupled to an Intranet.

* * * * *